(12) United States Patent
Stanciu et al.

(10) Patent No.: US 11,727,111 B1
(45) Date of Patent: Aug. 15, 2023

(54) DETECTING MALWARE BY LINKING BACKGROUND INTELLIGENT TRANSFER SERVICE (BITS) AND SCHEDULED TASK SERVICE (STS) ACTIVITIES TO A SOURCE PROGRAM

(71) Applicant: GEN DIGITAL INC., Tempe, AZ (US)

(72) Inventors: Andrei Stanciu, Bucharest (RO); Teodor Anton, Ploiesti (RO); Alin Enachescu, Costesti (RO); Robert A. Clyde, Spanish Fork, UT (US)

(73) Assignee: GEN DIGITAL INC., Tempe, AZ (US)

( * ) Notice: Subject to any disclaimer, the term of this patent is extended or adjusted under 35 U.S.C. 154(b) by 29 days.

(21) Appl. No.: 17/490,554

(22) Filed: Sep. 30, 2021

Related U.S. Application Data

(60) Provisional application No. 63/087,698, filed on Oct. 5, 2020.

(51) Int. Cl.
*G06F 21/54* (2013.01)
*G06F 21/56* (2013.01)
*G06F 21/55* (2013.01)

(52) U.S. Cl.
CPC ............ *G06F 21/54* (2013.01); *G06F 21/554* (2013.01); *G06F 21/564* (2013.01); *G06F 21/568* (2013.01)

(58) Field of Classification Search
USPC .......................................................... 726/22
See application file for complete search history.

(56) References Cited

U.S. PATENT DOCUMENTS

| | | | | |
|---|---|---|---|---|
| 7,990,962 | B2* | 8/2011 | Chang | H04L 12/1868 717/177 |
| 8,302,192 | B1* | 10/2012 | Cnudde | G06F 11/30 726/25 |
| 10,509,574 | B2* | 12/2019 | Novak | H04L 63/08 |
| 11,409,871 | B1* | 8/2022 | Naamneh | G06F 21/556 |
| 2006/0106807 | A1* | 5/2006 | DeVitis | G06F 16/9574 |
| 2013/0346444 | A1* | 12/2013 | Makkar | G06F 16/907 707/770 |
| 2018/0052720 | A1* | 2/2018 | Ionescu | G06F 9/547 |

FOREIGN PATENT DOCUMENTS

EP 1949270 B1 * 4/2011 .......... G06F 11/1453

* cited by examiner

*Primary Examiner* — Sakinah White Taylor
(74) *Attorney, Agent, or Firm* — Maschoff Brennan

(57) ABSTRACT

Detecting malware by linking Background Intelligent Transfer Service (BITS) and Scheduled Task Service (STS) activities to a source program. Using send Advanced Local Procedure Call (ALPC) messages and receive ALPC messages, source programs that initiate the creation of temporary files and perform defined operations may be identified. If the source programs responsible for the temporary files and defined operations are determined to be malware programs, a security action may be performed on the source programs.

20 Claims, 9 Drawing Sheets

DETECTING MALWARE BY LINKING BACKGROUND INTELLIGENT TRANSFER SERVICE (BITS) AND SCHEDULED TASK SERVICE (STS) ACTIVITIES TO A SOURCE PROGRAM

CROSS-REFERENCE TO A RELATED APPLICATION

This patent application claims the benefit of and priority to U.S. Provisional Application No. 63/087,698 filed Oct. 5, 2020, which is incorporated herein by reference.

BACKGROUND

The presence of malware on computers and other electronic devices can be difficult to detect. Malware programs abuse downloaders and task schedulers to avoid detection from antivirus programs or malware analysts. Even when malware has been detected on a computer, operating systems such as Windows™ do not offer reliable methods of identifying the program causing the malware to be downloaded or otherwise obtained from the Internet (i.e., the "source program"). It is thus very difficult to link the source program to its downstream effects (e.g., malware files downloaded or scheduled to be executed on a computer).

As a consequence, malware analysts and other programs attempt to look for specific downloader or task scheduler malware activity by searching for traces of malware activity recorded data and logs on an already infected system. These actions are not performed in real-time. This renders it essentially impossible to prevent or remediate an attack in real-time. Moreover, well-crafted malware can infect a computer without leaving any trace for a later analysis, thus precluding identification of the associated source program.

The subject matter claimed herein is not limited to embodiments that solve any disadvantages or that operate only in environments such as those described above. Rather, this background is only provided to illustrate one example technology area where some embodiments described herein may be practiced.

SUMMARY

In one embodiment, a computer-implemented method for detecting malware by linking transfer service activities to source programs may be performed, at least in part by a computing device comprising one or more processors, a memory, and an operating system stored within the memory. The method may include buffering, in a detection buffer within the memory, a plurality of send Advanced Local Procedure Call (ALPC) messages and a plurality of receive ALPC messages created by the operating system when a Background Intelligent Transfer Service (BITS) of the operating system is used to download one or more files to the computing device from a network. The method may also include identifying a first send ALPC message within the plurality of send ALPC messages and a first receive ALPC message within the plurality of receive ALPC messages, wherein the first send ALPC message and the first receive ALPC message have a first common message ID. The method may also include pairing the first send ALPC message and the first receive ALPC message to create a first ALPC message pair, wherein the first ALPC message pair includes: a first timestamp field having a value corresponding to a time of creation of at least one of the first send ALPC message and the first receive ALPC message, a first ALPC source process ID corresponding to a send process ID of the first send ALPC message, a first ALPC source thread ID corresponding to a send thread ID of the first send ALPC message, a first ALPC destination process ID corresponding to a receive process ID of the first receive ALPC message, and a first ALPC destination thread ID corresponding to a receive thread ID of the first receive ALPC message. The method may also include receiving a notification that a temporary file has been created by the BITS, the temporary file being created as part of a file download initiated by the source program. The method may also include determining that (1) the value in the first timestamp field corresponds to a time of creation of the temporary file, and (2) the first ALPC destination process ID corresponds to a process ID of the temporary file, and (3) the first ALPC destination thread ID corresponds to a thread ID of the temporary file. The method may also include evaluating the first ALPC source process ID to identify the source program responsible for initiating the creation of the temporary file. The method may also include determining, based at least in part on the temporary file, that the source program is a malware program. The method may also include performing a security action on the source program.

In some embodiments, the method may further include receiving a notification that the BITS has renamed the temporary file using a new file name and assigning the new file name to the source program.

In some embodiments, the method may further include identifying a second send ALPC message within the plurality of send ALPC messages and a second receive ALPC message within the plurality of receive ALPC messages, wherein the second send ALPC message and the second receive ALPC message have a second common message ID. In these embodiments, the method may also include pairing the second send ALPC message and the second receive ALPC message to create a second ALPC message pair, wherein the second ALPC message pair includes: a second timestamp field having a value corresponding to a time of creation of at least one of the second send ALPC message and the second receive ALPC message, a second ALPC source process ID corresponding to a send process ID of the second send ALPC message, a second ALPC source thread ID corresponding to a send thread ID of the second send ALPC message, a second ALPC destination process ID corresponding to a receive process ID of the second receive ALPC message, and a second ALPC destination thread ID corresponding to a receive thread ID of the second receive ALPC message. In these embodiments, the method may also include receiving a notification that a temporary file has been created by the BITS, the temporary file being created as part of a file download initiated by the source program. In this embodiment, the method may also include determining that (1) the value in the second timestamp field does not correspond to a time of creation of the temporary file, or (2) the second ALPC destination process ID does not correspond to a process ID of the temporary file, or (3) the second ALPC destination thread ID does not correspond to a thread ID of the temporary file. In these embodiments, the method may also include discarding the second ALPC message pair.

In some embodiments, the source program may be determined to be a malware program by evaluating the temporary file and determining that the temporary file is a malware file. In some embodiments, the security action may be quarantining the source program. In some embodiments, the security action may be deleting the source program.

In another embodiment, a computer-implemented method for detecting malware by linking scheduled task activities to source programs may be performed, at least in part by a computing device comprising one or more processors, a memory, and an operating system stored within the memory. The method may include buffering, in a detection buffer within the memory, a plurality of send Advanced Local Procedure Call (ALPC) messages and a plurality of receive ALPC messages created by the operating system when a Scheduled Task Service (STS) of the operating system is used to schedule a task to be performed by the operating system. The method may also include identifying a first send ALPC message within the plurality of send ALPC messages and a first receive ALPC message within the plurality of receive ALPC messages, wherein the first send ALPC message and the first receive ALPC message have a first common message ID. The method may also include pairing the first send ALPC message and the first receive ALPC message to create a first ALPC message pair, wherein the first ALPC message pair includes: a first timestamp field having a value corresponding to a time of creation of at least one of the first send ALPC message and the first receive ALPC message, a first ALPC source process ID corresponding to a send process ID of the first send ALPC message, a first ALPC source thread ID corresponding to a send thread ID of the first send ALPC message, a first ALPC destination process ID corresponding to a receive process ID of the first receive ALPC message, and a first ALPC destination thread ID corresponding to a receive thread ID of the first receive ALPC message. The method may also include receiving a notification that the STS has performed a defined operation, the STS performing the defined operation while being used by the source process. The method may also include determining that (1) the value in the first timestamp field corresponds to a time period when the defined operation was performed, and (2) the first ALPC destination process ID corresponds to a process ID of the STS involved in performing the defined operation, and (3) the first ALPC destination thread ID corresponds to a thread ID of the STS involved in performing the defined operation. The method may also include evaluating the first ALPC source process ID to identify the source program responsible for performing the defined operation. The method may also include determining, based at least in part on the defined operation, that the source program is a malware program. The method may also include performing a security action on the source program.

In some embodiments, the defined operation may correspond to creation of a file in a defined path. In these embodiments, the method may further include parsing the file in order to determine one or more tasks created by the source program. In these embodiments, the method may alternatively include parsing the file to determine one or more commands, which will execute the one or more tasks created by the source program.

In some embodiments, the defined operation may correspond to creation of new entry in a defined registry path.

In some embodiments, the method may further include identifying a second send ALPC message within the plurality of send ALPC messages and a second receive ALPC message within the plurality of receive ALPC messages, wherein the second send ALPC message and the second receive ALPC message have a second common message ID. In these embodiments, the method may also include pairing the second send ALPC message and the second receive ALPC message to create a second ALPC message pair, wherein the second ALPC message pair includes: a second timestamp field having a value corresponding to a time of creation of at least one of the second send ALPC message and the second receive ALPC message, a second ALPC source process ID corresponding to a send process ID of the second send ALPC message, a second ALPC source thread ID corresponding to a send thread ID of the second send ALPC message, a second ALPC destination process ID corresponding to a receive process ID of the second receive ALPC message, and a second ALPC destination thread ID corresponding to a receive thread ID of the second receive ALPC message. In these embodiments, the method may also include receiving a notification that the STS has performed a defined operation, the STS performing the defined operation while being used by the source process. In these embodiments, the method may also include determining that (1) the value in the second timestamp field does not correspond to a time period when the defined operation was performed, or (2) the second ALPC destination process ID does not correspond to a process ID of the STS involved in performing the defined operation, or (3) the second ALPC destination thread ID does not correspond to a thread ID of the STS involved in performing the defined operation. In these embodiments, the method may also include discarding the second ALPC message pair.

In some embodiments, the source program is determined to be a malware program by evaluating the defined operation and determining that the defined operation is a malware operation. In some embodiments, the security action is quarantining or deleting the source program.

It is to be understood that both the foregoing summary and the following detailed description are explanatory and are not restrictive of the invention as claimed.

BRIEF DESCRIPTION OF THE DRAWINGS

Embodiments will be described and explained with additional specificity and detail through the use of the accompanying drawings in which.

DETAILED DESCRIPTION

Figure 1:
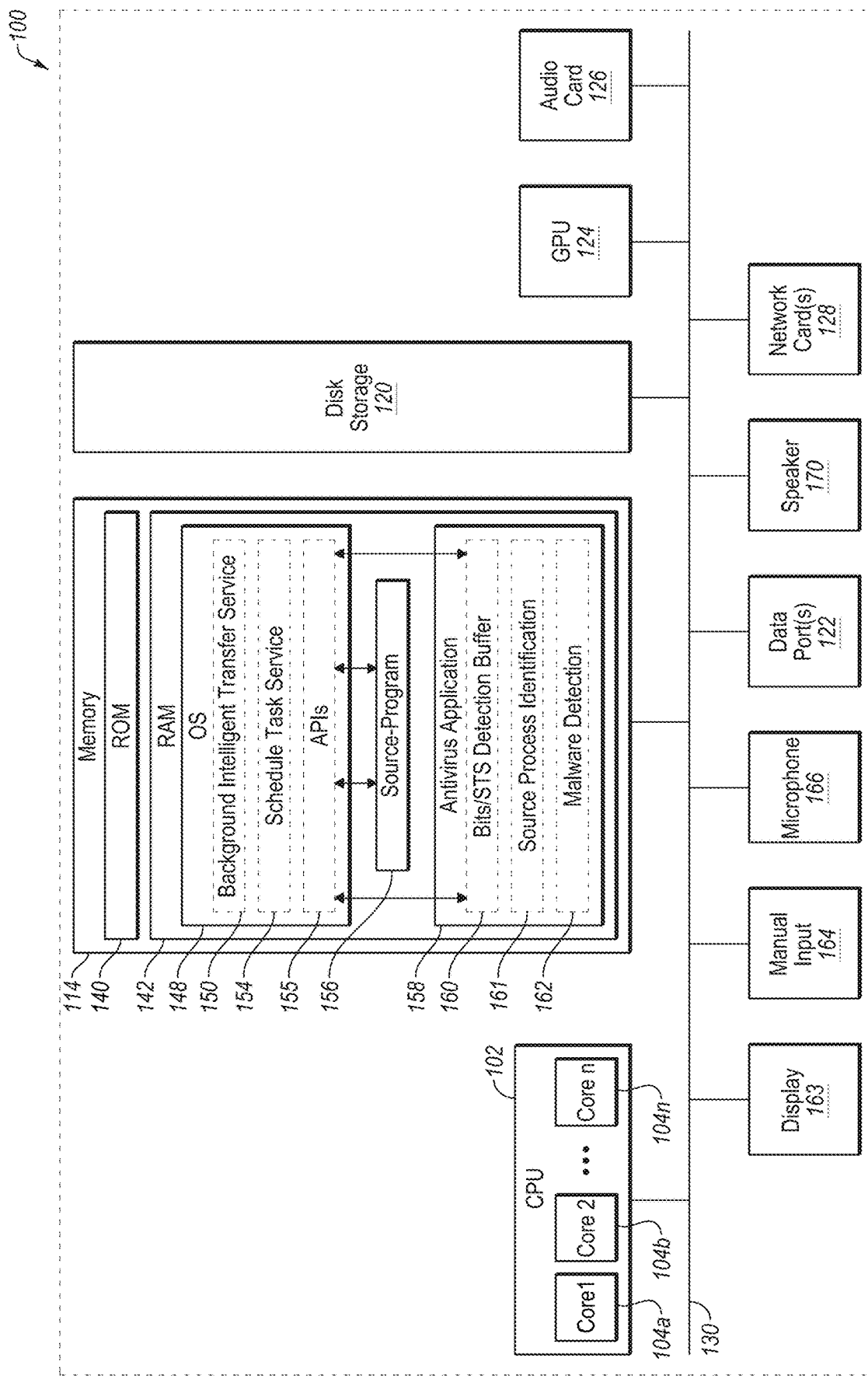
FIG. 1 illustrates an example computer system that may be employed in detecting malware by linking BITS or STS activities to a source program.

Disclosed herein are systems and methods for detecting malware by linking BITS or STS activities to a source program. The disclosed systems and methods leverage existing Application Programming Interfaces (APIs) in a novel manner to enable real time matching to a source program of files downloaded by a transfer service or tasks scheduled for execution by a task service. This enables "linking" the downloaded/scheduled files to malware source programs despite the loose connection between them. The method may scrutinize all activity occurring on a monitored computer or only that activity not already known to be legitimate, i.e., untrusted activity. Because such activity will typically be reported in in real time, an antivirus program can responsively remediate or prevent the system from becoming infected.

In one embodiment the method is implemented on computers configured with a Windows™ operating system. In this case the system leverages the download and scheduling services native to Windows™; that is the Background Intelligent Transfer Service (BITS) for downloading/running files from any uniform resource identifier URI path and the Scheduled Task Service (STS) for running processes. In order to investigate the effect of a program's activity on the BITS/STS, multiple tools and techniques are utilized. For example, Windows™ provides several tools to monitor the activities associated with a process. For example, Process Monitor may be used track process activities such as File Creation/Rename, and Microsoft™ Message Analyzer (MMA) may be used to track Event Tracing for Windows™ messages, which are related to various Advanced Local Procedure Call (ALPC) message types (e.g., ALPC_Receive_Message and ALPC_Send_Message). The use of tools such as these in the manner described herein enables identification of the source process responsible for the downloading of particular files by BITS and/or the scheduling of tasks by the STS.

Thus, the disclosed method implements an efficient tracking method that matches the files created by BITS, or tasks scheduled by STS, to the real source process by analyzing associated data in real time. This provides the linkage needed for malware detection.

For example, in one embodiment, a computer-implemented method for detecting malware by linking transfer service activities to source programs is disclosed. This computer-implemented may include buffering, in a detection buffer within a memory of the computing device, a plurality of send ALPC messages and a plurality of receive ALPC messages created by the operating system when a BITS of the operating system is used to download one or more files to the computing device from a network. This method may also include identifying a send ALPC message within the plurality of send ALPC messages and a receive ALPC message within the plurality of receive ALPC messages that have common message IDs. The send ALPC message may be paired with the receive ALPC message to create a ALPC message pair. This ALPC message pair may include: a timestamp field having a value corresponding to a time of creation of at least one of the send ALPC message and the receive ALPC message, an ALPC source process ID corresponding to a send process ID of the send ALPC message, an ALPC source thread ID corresponding to a send thread ID of the send ALPC message, an ALPC destination process ID corresponding to a receive process ID of the receive ALPC message, and an ALPC destination thread ID corresponding to a receive thread ID of the receive ALPC message. A notification may be received that a temporary file has been created by the BITS as part of a file download initiated by the source program. A determination may be made that (1) the value in the timestamp field corresponds to a time of creation of the temporary file, and (2) the ALPC destination process ID corresponds to a process ID of the temporary file, and (3) the ALPC destination thread ID corresponds to a thread ID of the temporary file. The ALPC source process ID may then be evaluated to identify the source program responsible for initiating the creation of the temporary file and a determination may be made that the source program is a malware program. Finally, a security action may be performed on the source program.

In another embodiment, a computer-implemented method for detecting malware by linking scheduled task activities to source programs is disclosed. This computer-implemented may include buffering, in a detection buffer within a memory of the computing device, a plurality of send ALPC messages and a plurality of receive ALPC messages created by the operating system when an STS of the operating system is used to schedule a task to be performed by the operating system. This method may also include identifying a send ALPC message within the plurality of send ALPC messages and a receive ALPC message within the plurality of receive ALPC messages that have common message IDs. The send ALPC message may be paired with the receive ALPC message to create a ALPC message pair. This ALPC message pair may include: a timestamp field having a value corresponding to a time of creation of at least one of the send ALPC message and the receive ALPC message, an ALPC source process ID corresponding to a send process ID of the send ALPC message, an ALPC source thread ID corresponding to a send thread ID of the send ALPC message, an ALPC destination process ID corresponding to a receive process ID of the receive ALPC message, and an ALPC destination thread ID corresponding to a receive thread ID of the receive ALPC message. A notification may be received that the STS has performed a defined operation while being used by the source process. A determination may be made that (1) the value in the timestamp field corresponds to a time period when the defined operation was performed, and (2) the ALPC destination process ID corresponds to a process ID of the STS involved in performing the defined operation, and (3) the ALPC destination thread ID corresponds to a thread ID of the STS involved in performing the defined operation. The ALPC source process ID may then be evaluated to identify the source program responsible for performing the defined operation and a determination may be made that the source program is a malware program. Finally, a security action may be performed on the source program.

Various additional embodiments are described below with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) can be practiced without these specific details. In other instances, well-known structures and devices are shown in block diagram form in order to facilitate describing one or more embodiments.

Attention is now directed to FIG. 1, which is an example computer system that may be employed in detecting malware by linking BITS or STS activities to a source program. In some embodiments, the computer system 100 may be, for example, a desktop computer, a client computer, a server computer, a mobile phone, a laptop computer, a smartphone, a smartwatch, a tablet computer, a portable music player, a networking device, or any other computer system. Computer system 100 may be capable of communicating over a network. As shown, computer system 100 includes a multicore central processing unit ("CPU") 102 having a plurality of cores 104a-104n, system memory 114, disk storage 120, data port(s) 122, graphics processing unit (GPU) 124, audio card 126, and network card(s) 128 connected by system bus 130.

The CPU 102 may include any suitable special-purpose or general-purpose computer, computing entity, or processing device including various computer hardware or software applications and may be configured to execute instructions stored on any applicable computer-readable storage media. For example, the CPU 102 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data, or any combination thereof. In some embodiments, the CPU 102 may interpret and/or execute program instructions and/or process data stored in the memory 114 and/or a file system. In some embodiments, the CPU 102 may fetch program instructions from a file system and load the program instructions into the memory 114. After the program instructions are loaded into the memory 114, the CPU 102 may execute the program instructions. In some embodiments, the instructions may include the CPU 102 performing one or more of the actions of the methods disclosed herein.

System bus 130 may include a memory bus or memory controller, a peripheral bus, and a local bus, and may utilize any of a various known bus architectures. Network card(s) 128 may provide an Ethernet, Wi-Fi, GSM, Bluetooth or other wired, wireless, or cellular network interface for connecting computer system 100 to a network. The network may include any wired or wireless network, or combination of multiple networks, configured to send and receive communications between systems and devices. In some embodiments, the network may include a Personal Area Network (PAN), a Local Area Network (LAN), a Metropolitan Area Network (MAN), a Wide Area Network (WAN), a Storage Area Network (SAN), a cellular network, the Internet, or some combination thereof.

Data port 122 may be any data port as is known in the art for interfacing with an external accessory using a data protocol such as RS-232, USB, or Firewire. Disk storage 120 may be a conventional read/write memory such as a magnetic disk drive, floppy disk drive, compact-disk read-only-memory (CD-ROM) drive, digital video disk (DVD) read or write drive, transistor-based memory or other computer-readable memory device as is known in the art for storing and retrieving data.

The system memory 114 may include computer-readable storage media for carrying or having stored thereon computer-executable instructions or data structures. Such computer-readable storage media may be any available non-transitory media that may be accessed by a general-purpose or special-purpose computer, such as the CPU 102. By way of example, and not limitation, such computer-readable storage media may include non-transitory computer-readable storage media including Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage media which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the CPU 102 to perform a certain operation or group of operations, such as one or more of the actions of the methods disclosed herein. These computer-executable instructions may be included, for example, in the operating system 148, in one or more applications, or in some combination thereof.

In one embodiment, system memory 114 may include a read-only memory (ROM) 140 and random access memory (RAM) 142. The ROM 140 generally stores a basic input/output system (BIOS), which contains foundational routines to convey information between components of computer system 100. RAM 142 stores an operating system 148 (OS), such as, for example, Windows™, Linux™ or another type of OS. In the case of Windows™, the operating system 148 includes a Background Intelligent Transfer Service (BITS) 150, a Scheduled Task Service (STS) 154, and various APIs 155. Various source programs 156 (each referred to herein as a "Source Program") operative to utilize, via the APIs 155, the BITS 150, and/or the STS 154 may also be stored in RAM 142.

System memory 114 also stores a specially configured antivirus application or monitor program 158 disposed to link Source Programs to files downloaded by BITS 150 or tasks scheduled by the STS 154. The antivirus application or monitor program 158 includes a BITS/STS detection buffer 160, a source process identification module 161 and a malware detection module 162. The antivirus application or monitor program 158 may be one or more computer-readable instructions stored on one or more non-transitory computer-readable media, such as the memory 114 or the disk storage 120, that, when executed by the CPU 102, is configured to perform one or more of the actions of the methods disclosed herein. In some embodiments, the antivirus application or monitor program 158 may be part of the operating system 148 or may be part of an application of the computer system 100, or may be some combination thereof.

CPU 102 communicates with a plurality of peripheral equipment. Additional peripheral equipment may include a display 163, manual input device 164 and microphone 166. Display 163 may be a visual display such as a liquid crystal display (LCD) screen, touch-sensitive screen, or other monitors as are known in the art for visually displaying images and text to a user. Manual input device 164 may be a conventional keyboard, keypad, mouse, trackball, or other input device as is known in the art for the manual input of data. Microphone 166 may be any suitable microphone as is known in the art for providing audio signals to CPU 102. In addition, a speaker 170 may be attached for reproducing audio signals from CPU 102. It is understood that microphone 166 and speaker 170 may include appropriate digital-to-analog and analog-to-digital conversion circuitry as appropriate.

Modifications, additions, or omissions may be made to the computer system 100 without departing from the scope of the present disclosure. For example, any of the components of the computer system 100 may include multiple similar components that function collectively and are communicatively coupled. Further, although illustrated as a single computer system, it is understood that the computer system 100 may include multiple physical or virtual computer systems that are networked together, such as in a cloud computing environment, a multitenancy environment, or a virtualization environment.

As indicated above, the embodiments described herein may include the use of a special purpose or general purpose computer (e.g., the CPU 102) including various computer hardware or software applications, as discussed in greater detail below. Further, as indicated above, embodiments described herein may be implemented using computer-readable media (e.g., the memory 114) for carrying or having computer-executable instructions or data structures stored thereon.

In some embodiments, the different components and applications described herein may be implemented as objects or processes that execute on a computing system (e.g., as separate threads). While some of the methods described herein are generally described as being implemented in software (stored on and/or executed by general purpose hardware), specific hardware implementations or a combination of software and specific hardware implementations are also possible and contemplated.

Figure 2:
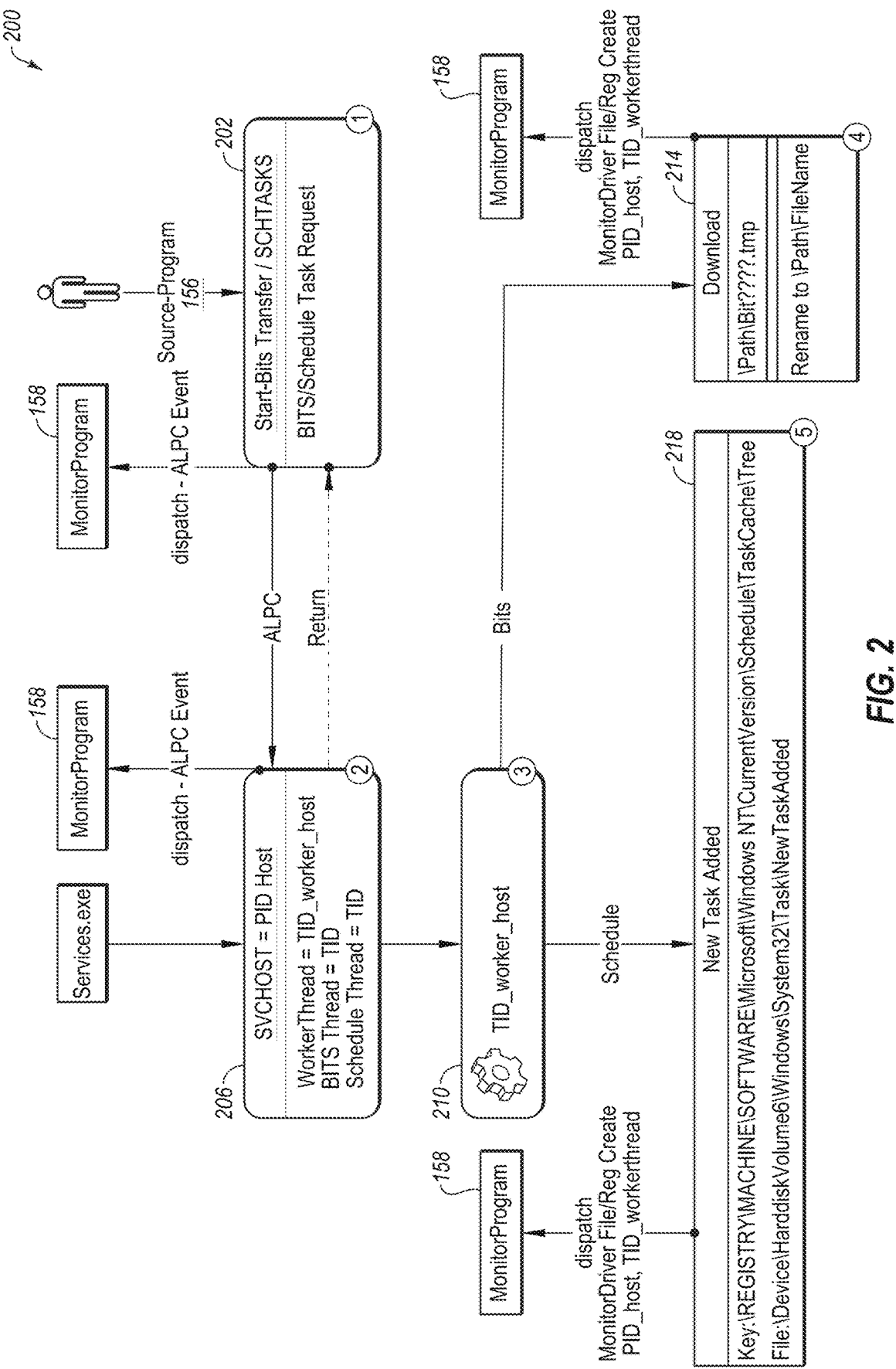
FIG. 2 illustrates a method for information flow and data collection configured for detecting malware by linking BITS or STS activities to a source program.

Attention is now directed to FIG. 2, which illustrates a method for information flow and data collection configured for detecting malware by linking BITS or STS activities to a source program, which may be implemented by the antivirus application or monitor program 158. In the Windows™ operating system, the BITS can be used by legitimate programs (e.g., Windows™ Update or Chrome Update) to facilitate the "transfer" of files from the Internet, but may also be used by malicious programs to facilitate such transfers (stage 202). This can be done using documented Windows™ APIs to create an asynchronous job. In a similar way, the STS is used to execute programs (stage 202).

Both services (BITS and STS) are located in svchost.exe, a process that can host from one to many Windows™ Services, can be the same process or not, and the jobs are executed by a thread pool located in the same process (the thread pool can be used by multiple services if they are loaded in the same svchost.exe) (stages 206, 210). As noted above, we will call the process that initiates a BITS or STS job the Source Program 156. When a file is downloaded using BITS or a scheduled task is created using STS, many ALPC messages are sent from the Source Program 156 to the svchost.exe where the BITS or STS are loaded. For each of those ALPC messages an Event Tracing for Windows™ (ETW) message is also dispatched by kernel (stages 202, 206).

When a BITS job is created by Source Program 156, it is allocated to a random thread from the thread pool. When the BITS job is started, a temporary file (named BIT????.tmp, where "?" is a hexadecimal character) will be created by the BITS 150. After the file is downloaded, the BITS 150 will rename the temporary file with the name requested by the Source Program 156 (stage 214). When a Schedule Task is created, a file is added to the folder: Windows\System32\Tasks (stage 218).

Figure 3:
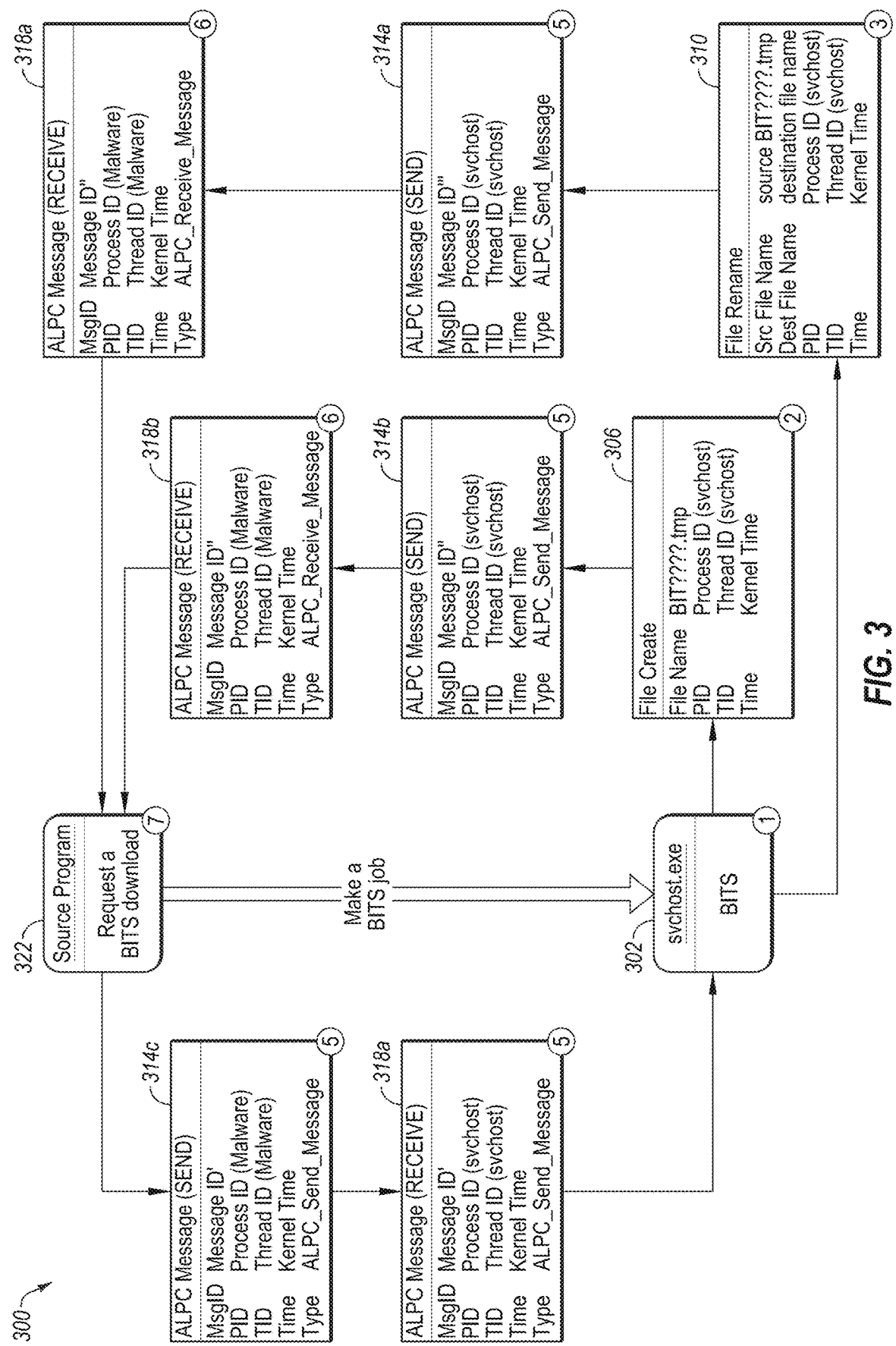
FIG. 3 illustrates a data collection and basic data merging process configured for detecting malware by linking BITS or STS activities to a source program.

Attention is now directed to FIG. 3, which illustrates a data collection and basic data merging process configured for detecting malware by linking BITS or STS activities to a source program, which may be implemented by the antivirus application or monitor program 158. Pursuant to the method 300, detailed data is collected and merged in order to detect that a particular program (e.g., a "malware" program) was the program responsible for initiating a BITS transfer. In order to detect malicious code that uses downloaders and schedulers, the antivirus application or monitor program 158 may be configured to collect the following data in parallel:
  1. Process ID (PID) for BITS 150 and STS 154 (stage 302).
  2. Temporary files created by BITS 150 along with the thread ID and the kernel time of creation (stage 306).
  3. Rename operations executed by BITS 146 from temporary file in the file name requested by Source Program 156 along with thread ID and the kernel time of rename (stage 310).
  4. Files that are created by STS 154 in the C:\Windows\System32\Tasks path along with the thread ID and the time of creation.
  5. ALPC_Send_Message events along with the message ID, process ID, thread ID, and the time of event (stage 314a, 314b).
  6. ALPC_Receive_Message events along with the message ID, process ID, thread ID and the time of event (stage 318a, 318b).
  7. Process IDs for all processes (stage 322).

Figure 4:
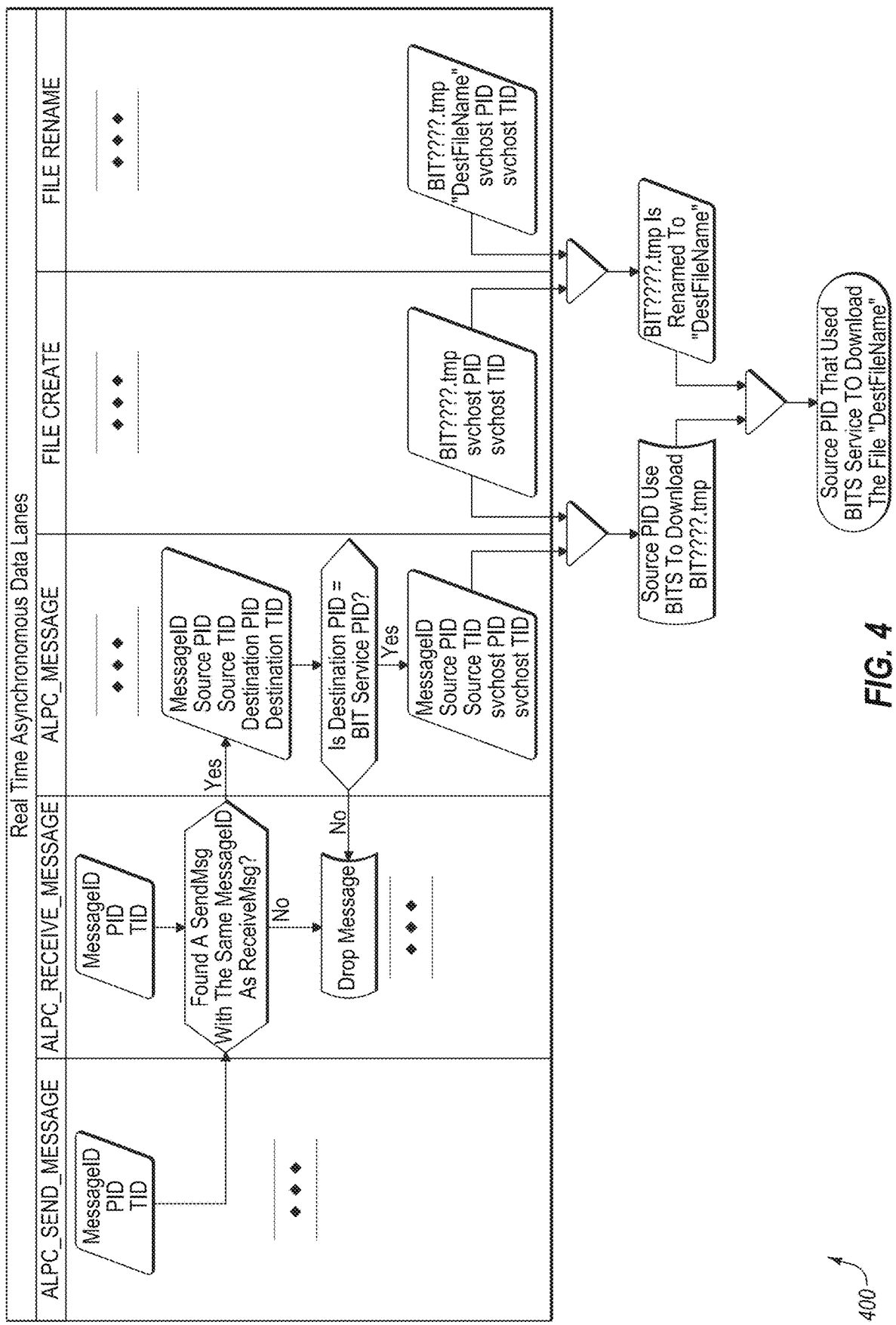
FIG. 4 illustrates a flowchart configured for detecting malware by linking BITS activities to a source program.

Attention is now directed to FIG. 4, which illustrates a flowchart configured for detecting malware by linking BITS activities to a source program. In one embodiment the antivirus application or monitor program 158 implements the method 400 by performing the following operations:
  1. Each ALPC_Receive_Message is paired by the antivirus application or monitor program 158 with a previous ALPC_Send_Message that have the same message ID. This pair may be called an ALPC message. In one embodiment an ALPC message contains 5 fields:
    a. Timestamp—contains the time of ALPC_Receive_Message event.
    b. SourceProcessId—contains the process ID from ALPC_Send_Message event.
    c. SourceThreadId—contains the thread ID from ALPC_Send_Message event.
    d. DestinationProcessId—contains the process ID from ALPC_Receive_Message event.
    e. DestinationThreadId—contains the thread ID from ALPC_Receive_Message event. All ALPC messages that don't have SourceProcessId/DestionationProcessId equal to BITS Service process IDs may be dropped.
  2. Upon being notified that the BITS Service created a temporary file, the antivirus application or monitor program 158 searches for an ALPC message that has the timestamp in the same time period as the temporary file creation and the DestinationProcessId and DestinationThreadId are the same as the process ID and thread ID that created the temporary file. After finding such an ALPC message, the process that started the file download can be identified by examining the SourceProcessId field. There is an ALPC message for each file from a BITS job (there can be more files in same job).
  3. Upon being notified that the BITS Service renamed a temporary file, the antivirus application or monitor program 158 gets the new file name and assigns it to the Source Program. Now the antivirus application or monitor program 158 knows which files have been downloaded from the Internet by the Source Program 156 using BITS 150. If what is of interest is simply knowing if a program used BITS 150, then step 3 can be ignored.

Since in one embodiment everything is asynchronous, ALPC messages can be received after the temporary file creation or even after the temporary file rename if a small file is downloaded. The ALPC messages are typically received before temporary file creation but that is not guaranteed, so in one embodiment everything is added to the detection buffer 160 to ensure that all ALPC messages relevant to a particular event (e.g., file creation, temporary file rename, etc.) are received prior to processing and evaluation of the event.

Figure 5:
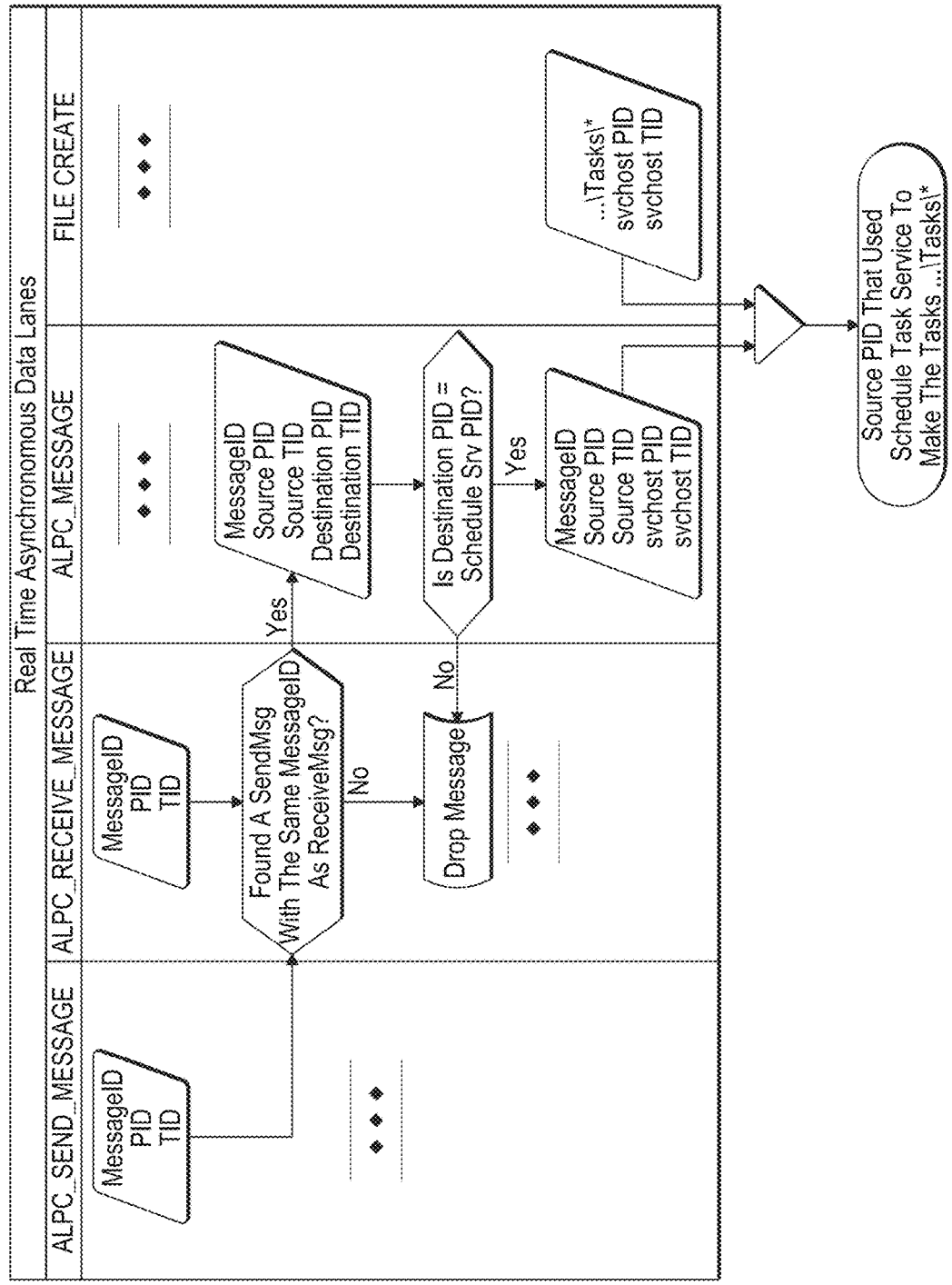
FIG. 5 illustrates a flowchart configured for detecting malware by linking STS activities to a source program.

Attention is now directed to FIG. 5, which illustrates a flowchart configured for detecting malware by linking STS activities to a source program. In one embodiment the antivirus application or monitor program 158 implements the method 500 by performing the following operations:

1. The antivirus application or monitor program 158 operates in the same manner as the BITS detection method 400 discussed above with reference to FIG. 4, with the except that in the method 500 the program 158 drops all ALPC messages that do not have SourceProcessId/DestinationProcessId equal to STS process ID.
2. Upon being notified that the STS 154 created a file in the C:\Windows\System32\Tasks path, the antivirus application or monitor program 158 searches for an ALPC message that (i) has the timestamp in the same time period as the file creation and (ii) for which the DestinationProcessId and DestinationThreadId are the same as the process ID and thread ID that created the file.
3. The created file is an XML file and by parsing it the antivirus application or monitor program 158 can find the exact command that will be executed. (See, e.g., https://docs.microsoft.com/en-us/windows/win32/taskschd/task-scheduler-schema). At this point the antivirus application or monitor program 158 knows what tasks are created by Source Program and what command will execute the scheduled task.

As an alternative to the above step 2 in this technique, the antivirus application or monitor program 158 could monitor new entries in the registry path: \REGISTRY\MACHINE\SOFTWARE\Microsoft\WindowsNT\CurrentVersion\Schedule\TaskCache\Tree that is also added when a new task is created. Note that since everything is asynchronous, the antivirus application or monitor program 158 may receive an ALPC message after the file creation. Although ALPC messages are generally received before file creation, this is not guaranteed. Accordingly, in one embodiment everything is added to the detection buffer 160 to ensure that all ALPC messages relevant to a particular event are received prior to processing and evaluation of the event.

Figure 6A:
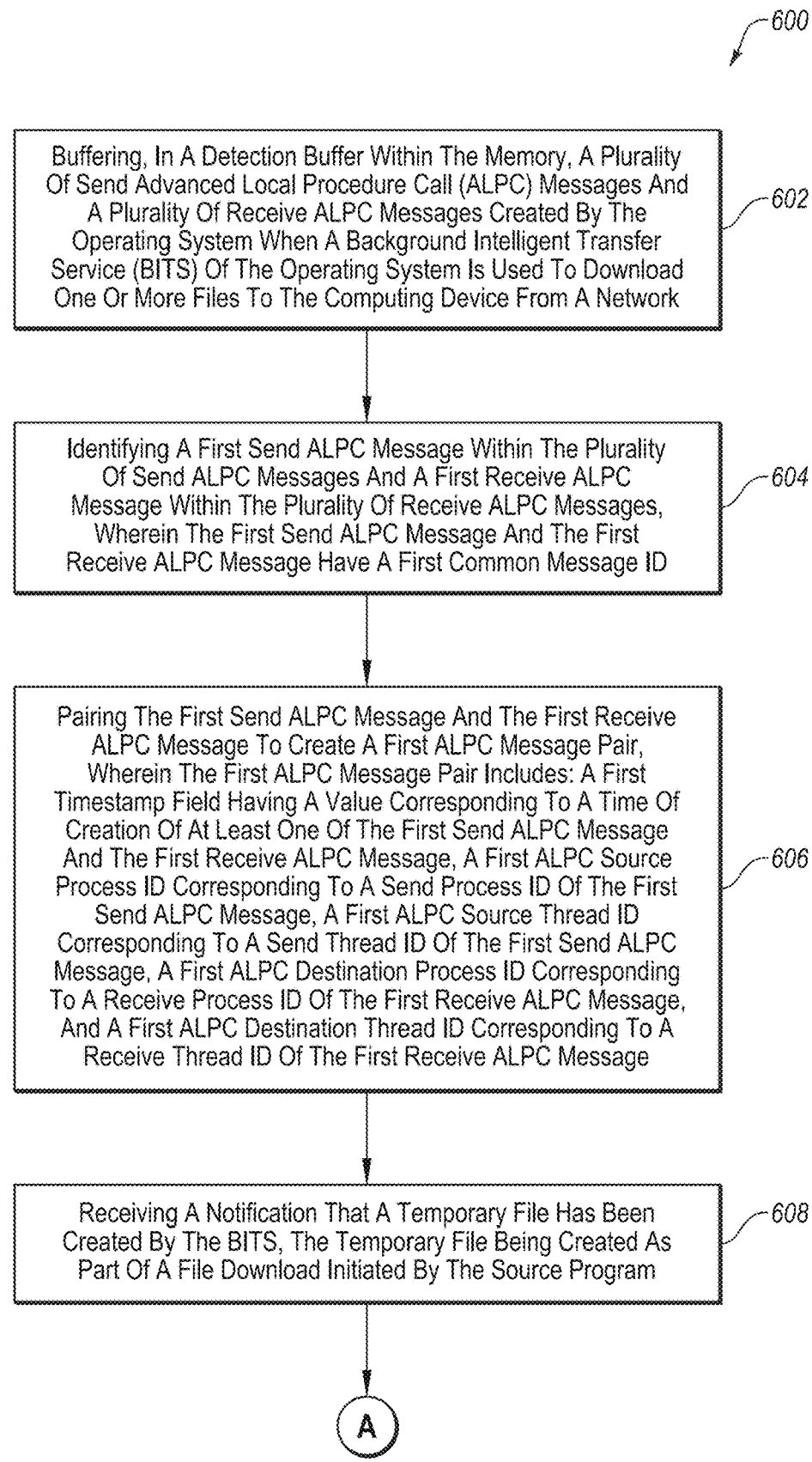
FIGS. 6A and 6B illustrate a flowchart of an example method for detecting malware by linking BITS activities to a source program.
Figure 6B:
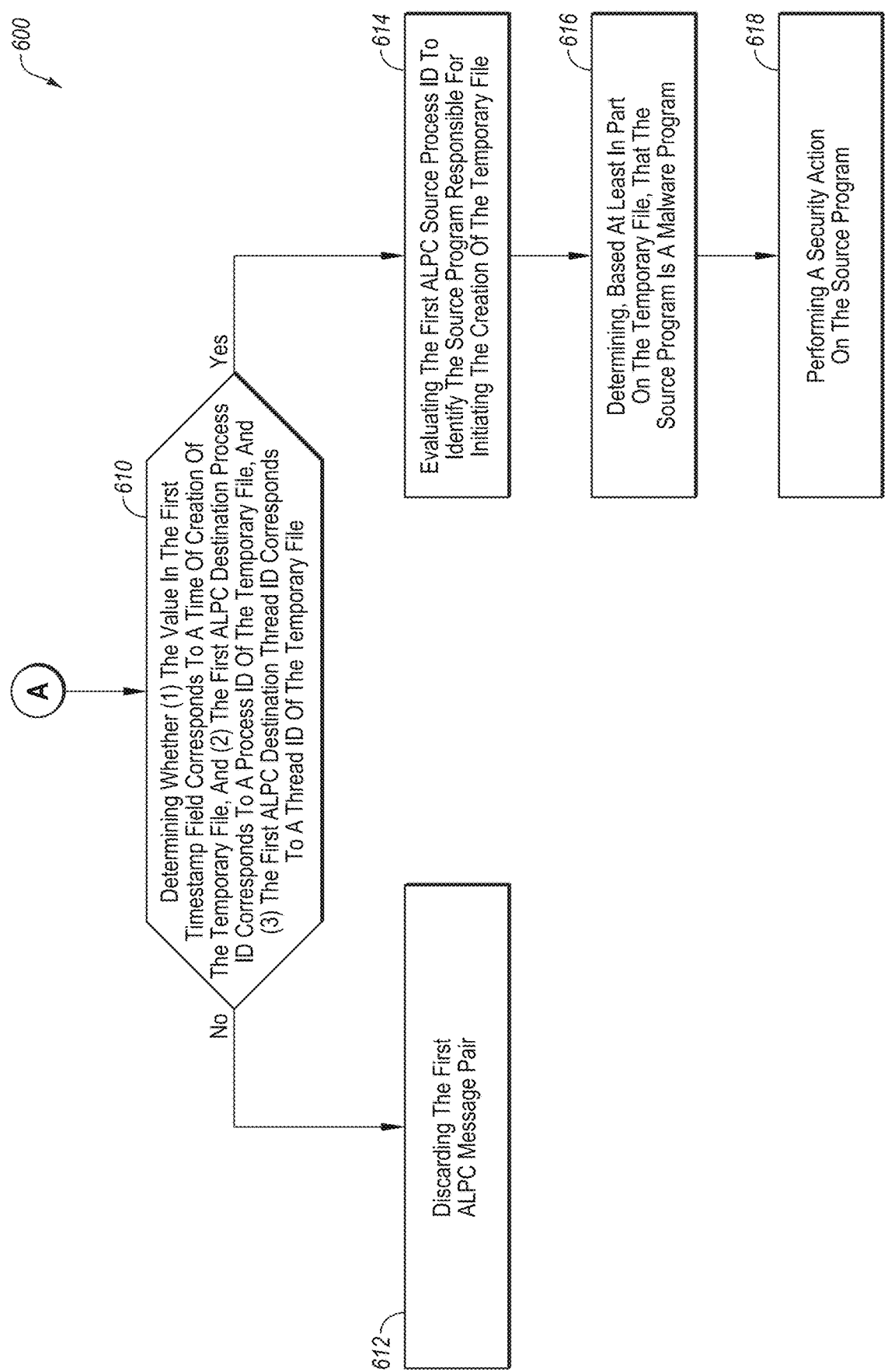

FIGS. 6A and 6B illustrate a flowchart of an example method 600 for detecting malware by linking BITS activities to a source program. The method 600 may be performed, in some embodiments, by a device or system, such as by the antivirus application or monitor program 158. In these and other embodiments, the method 600 may be performed by one or more processors based on one or more computer-readable instructions stored on one or more non-transitory computer-readable media. The method 300 will now be described in connection with FIGS. 1-5.

The method 600 may include, at action 602, buffering, in a detection buffer within the memory, a plurality of send Advanced Local Procedure Call (ALPC) messages and a plurality of receive ALPC messages created by the operating system when a Background Intelligent Transfer Service (BITS) of the operating system is used to download one or more files to the computing device from a network.

The method 600 may include, at action 604, identifying a first send ALPC message within the plurality of send ALPC messages and a first receive ALPC message within the plurality of receive ALPC messages, wherein the first send ALPC message and the first receive ALPC message have a first common message ID.

The method 600 may include, at action 606, pairing the first send ALPC message and the first receive ALPC message to create a first ALPC message pair, wherein the first ALPC message pair includes: a first timestamp field having a value corresponding to a time of creation of at least one of the first send ALPC message and the first receive ALPC message, a first ALPC source process ID corresponding to a send process ID of the first send ALPC message, a first ALPC source thread ID corresponding to a send thread ID of the first send ALPC message, a first ALPC destination process ID corresponding to a receive process ID of the first receive ALPC message, and a first ALPC destination thread ID corresponding to a receive thread ID of the first receive ALPC message.

The method 600 may include, at action 608, receiving a notification that a temporary file has been created by the BITS, the temporary file being created as part of a file download initiated by the source program.

The method 600 may include, at action 610, determining whether (1) the value in the first timestamp field corresponds to a time of creation of the temporary file, and (2) the first ALPC destination process ID corresponds to a process ID of the temporary file, and (3) the first ALPC destination thread ID corresponds to a thread ID of the temporary file.

If (1) the value in the first timestamp field does not correspond to a time of creation of the temporary file, or (2) the first ALPC destination process ID does not correspond to a process ID of the temporary file, or (3) the first ALPC destination thread ID does not correspond to a thread ID of the temporary file, then the method 600 may include, at action 612, discarding the first ALPC message pair.

However, if it is determined that (1) the value in the first timestamp field corresponds to a time of creation of the temporary file, and (2) the first ALPC destination process ID corresponds to a process ID of the temporary file, and (3) the first ALPC destination thread ID corresponds to a thread ID of the temporary file, then the method 600 may include, at action 614, evaluating the first ALPC source process ID to identify the source program responsible for initiating the creation of the temporary file.

The method 600 may include, at action 616, determining, based at least in part on the temporary file, that the source program is a malware program. A determination that the source program is a malware program may be made, for example, by determining that the temporary file is also malware or infected. For example, a determination that the temporary file is malware or infected may be made by through regular signature and/or cloud scan. In another example, a determination that the temporary file is malware or infected may be made if the source program downloads the temporary file from a blacklisted server.

The method 600 may include, at action 618, performing a security action on the source program. This security action may include quarantining and/or deleting the source program.

Figure 7A:
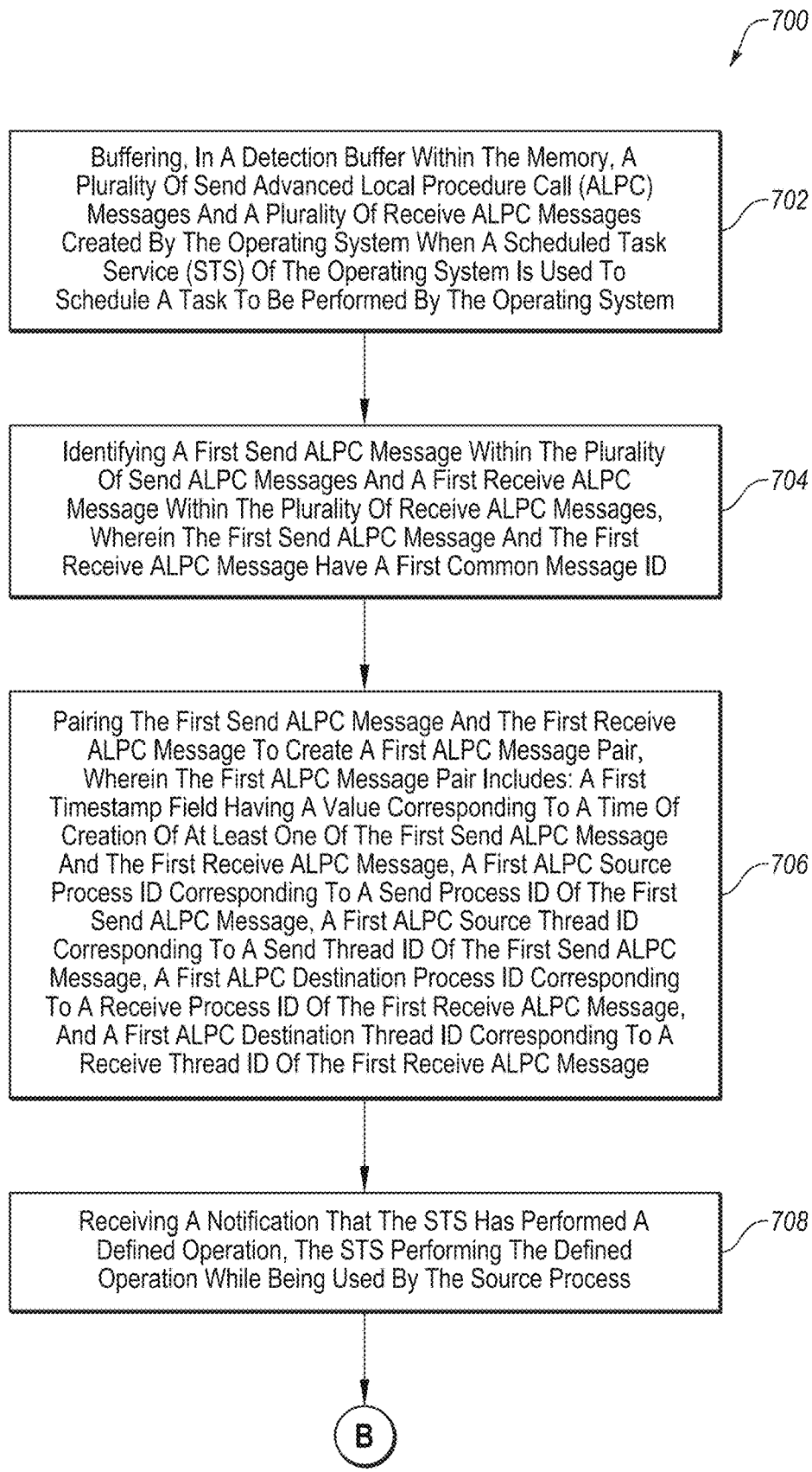
FIGS. 7A and 7B illustrate a flowchart of an example method for detecting malware by linking STS activities to a source program.
Figure 7B:
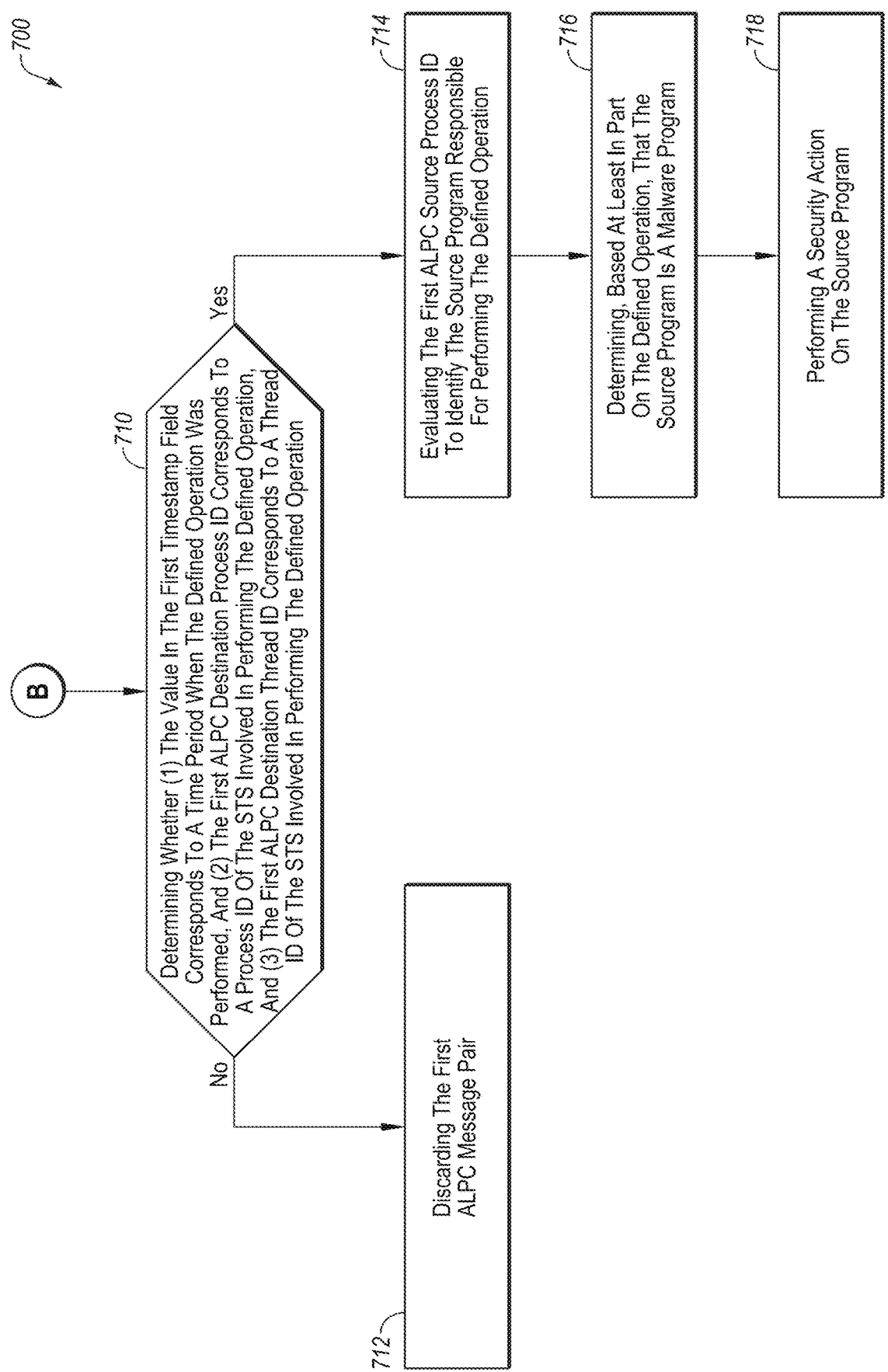

FIGS. 7A and 7B illustrate a flowchart of an example method 700 for detecting malware by linking STS activities to a source program. The method 700 may be performed, in some embodiments, by a device or system, such as by the antivirus application or monitor program 158. In these and other embodiments, the method 700 may be performed by one or more processors based on one or more computer-readable instructions stored on one or more non-transitory computer-readable media. The method 300 will now be described in connection with FIGS. 1-5.

The method 700 may include, at action 702, buffering, in a detection buffer within the memory, a plurality of send Advanced Local Procedure Call (ALPC) messages and a plurality of receive ALPC messages created by the operating system when a Scheduled Task Service (STS) of the operating system is used to schedule a task to be performed by the operating system.

The method 700 may include, at action 704, identifying a first send ALPC message within the plurality of send ALPC messages and a first receive ALPC message within the plurality of receive ALPC messages, wherein the first send ALPC message and the first receive ALPC message have a first common message ID.

The method 700 may include, at action 706, pairing the first send ALPC message and the first receive ALPC message to create a first ALPC message pair, wherein the first ALPC message pair includes: a first timestamp field having a value corresponding to a time of creation of at least one of the first send ALPC message and the first receive ALPC message, a first ALPC source process ID corresponding to a send process ID of the first send ALPC message, a first ALPC source thread ID corresponding to a send thread ID of the first send ALPC message, a first ALPC destination process ID corresponding to a receive process ID of the first receive ALPC message, and a first ALPC destination thread ID corresponding to a receive thread ID of the first receive ALPC message.

The method 700 may include, at action 708, receiving a notification that the STS has performed a defined operation, the STS performing the defined operation while being used by the source process.

The method 700 may include, at action 710, determining whether (1) the value in the first timestamp field corresponds to a time period when the defined operation was performed, and (2) the first ALPC destination process ID corresponds to a process ID of the STS involved in performing the defined operation, and (3) the first ALPC destination thread ID corresponds to a thread ID of the STS involved in performing the defined operation.

If (1) the value in the first timestamp field does not correspond to a time period when the defined operation was performed, or (2) the first ALPC destination process ID does not correspond to a process ID of the STS involved in performing the defined operation, or (3) the first ALPC destination thread ID does not correspond to a thread ID of the STS involved in performing the defined operation, then the method 700 may include, at action 712, discarding the first ALPC message pair.

However, if it is determined that (1) the value in the first timestamp field corresponds to a time period when the defined operation was performed, and (2) the first ALPC destination process ID corresponds to a process ID of the STS involved in performing the defined operation, and (3) the first ALPC destination thread ID corresponds to a thread ID of the STS involved in performing the defined operation, then the method 700 may include, at action 714, evaluating the first ALPC source process ID to identify the source program responsible for performing the defined operation.

The method 700 may include, at action 716, determining, based at least in part on the defined operation, that the source program is a malware program. A determination that the source program is a malware program may be made, for example, by determining that the defined operation is also malware or the tasks that it schedules are malicious. For example, a determination that the defined operation is malware or malicious may be made by through regular signature and/or cloud scan.

The method 700 may include, at action 718, performing a security action on the source program. This security action may include quarantining and/or deleting the source program.

The methods 600 and 700 may thus be employed, in some embodiments, to detect malware by linking transfer service and scheduled task activities to source programs. Because BITS and STS are used to identify malware source programs, the identification of this malware may be performed in real time and a security action can be taken before these source programs are able to have significant downstream effects.

Although the actions of the methods 600 and 700 are illustrated in FIGS. 6A, 6B, 7A, and 7B as discrete actions, various actions may be divided into additional actions, combined into fewer actions, reordered, expanded, or eliminated, depending on the desired implementation.

Further, it is understood that the methods 600 and 700 may improve the functioning of a computer system itself. For example, the functioning of computing system 100 of FIG. 1 may itself be improved by the methods 600 and 700. Specifically, by identifying malware source programs quickly and performing a security action, downstream effects on the computing system may be avoided. These downstream effects may include a variety of functions such as stealing, encrypting, or deleting sensitive data on the computing system 100. These downstream effects may also include altering or hijacking core functions of the computing system 100 and monitoring a user's activity. Allowing a computing system to run malware source programs may ultimately render the computing system inoperable.

In one or more exemplary embodiments, the functions, methods, and processes described herein may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

As used herein, computer program products comprising computer-readable media including all forms of computer-readable medium except, to the extent that such media is deemed to be non-statutory, transitory propagating signals.

It is understood that the specific order or hierarchy of steps or stages in the processes and methods disclosed are examples of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps or stages of a method, process or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In accordance with common practice, the various features illustrated in the drawings may not be drawn to scale. The illustrations presented in the present disclosure are not meant to be actual views of any particular apparatus (e.g., device, system, etc.) or method, but are merely example representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the summary, detailed description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

The foregoing description, for purpose of explanation, has been described with reference to specific embodiments. However, the illustrative discussions above are not intended to be exhaustive or to limit the invention as claimed to the precise forms disclosed. Many modifications and variations are possible in view of the above teachings. The embodiments were chosen and described to explain practical applications, to thereby enable others skilled in the art to utilize the invention as claimed and various embodiments with various modifications as may be suited to the particular use contemplated.

The invention claimed is:

1. A computer-implemented method for detecting malware by linking transfer service activities to source programs, at least a portion of the method performed by a computing device comprising one or more processors, a memory, and an operating system stored within the memory, the computer-implemented method comprising:

buffering, in a detection buffer within the memory, a plurality of send Advanced Local Procedure Call (ALPC) messages and a plurality of receive ALPC messages created by the operating system when a Background Intelligent Transfer Service (BITS) of the operating system is used to download one or more files to the computing device from a network;

identifying a first send ALPC message within the plurality of send ALPC messages and a first receive ALPC message within the plurality of receive ALPC messages, wherein the first send ALPC message and the first receive ALPC message have a first common message ID;

pairing the first send ALPC message and the first receive ALPC message to create a first ALPC message pair, wherein the first ALPC message pair includes:
  a first timestamp field having a value corresponding to a time of creation of at least one of the first send ALPC message and the first receive ALPC message,
  a first ALPC source process ID corresponding to a send process ID of the first send ALPC message,
  a first ALPC source thread ID corresponding to a send thread ID of the first send ALPC message,
  a first ALPC destination process ID corresponding to a receive process ID of the first receive ALPC message, and
  a first ALPC destination thread ID corresponding to a receive thread ID of the first receive ALPC message;

receiving a notification that a temporary file has been created by the BITS, the temporary file created as part of a file download initiated by the source program;

determining that (1) the value in the first timestamp field corresponds to a time of creation of the temporary file, and (2) the first ALPC destination process ID corresponds to a process ID of the temporary file, and (3) the first ALPC destination thread ID corresponds to a thread ID of the temporary file;

evaluating the first ALPC source process ID to identify the source program responsible for initiating the creation of the temporary file;

determining, based at least in part on the temporary file, that the source program is a malware program; and performing a security action on the source program.

2. The method of claim 1, further comprising:
receiving a notification that the BITS has renamed the temporary file using a new file name; and
assigning the new file name to the source program.

3. The method of claim 1, further comprising:
identifying a second send ALPC message within the plurality of send ALPC messages and a second receive ALPC message within the plurality of receive ALPC messages, wherein the second send ALPC message and the second receive ALPC message have a second common message ID;

pairing the second send ALPC message and the second receive ALPC message to create a second ALPC message pair, wherein the second ALPC message pair includes:
  a second timestamp field having a value corresponding to a time of creation of at least one of the second send ALPC message and the second receive ALPC message,
  a second ALPC source process ID corresponding to a send process ID of the second send ALPC message,
  a second ALPC source thread ID corresponding to a send thread ID of the second send ALPC message,
  a second ALPC destination process ID corresponding to a receive process ID of the second receive ALPC message, and
  a second ALPC destination thread ID corresponding to a receive thread ID of the second receive ALPC message;

receiving a notification that a temporary file has been created by the BITS, the temporary file created as part of a file download initiated by the source program;

determining that (1) the value in the second timestamp field does not correspond to a time of creation of the temporary file, or (2) the second ALPC destination process ID does not correspond to a process ID of the temporary file, or (3) the second ALPC destination thread ID does not correspond to a thread ID of the temporary file; and discarding the second ALPC message pair.

4. The method of claim 1, wherein the source program is determined to be a malware program by evaluating the temporary file and determining that the temporary file is a malware file.

5. The method of claim 1, wherein the security action is quarantining the source program.

6. The method of claim 1, wherein the security action is deleting the source program.

7. One or more non-transitory computer-readable media comprising one or more computer-readable instructions that, when executed by one or more processors of a computing device, cause the computing device to perform a method for detecting malware by linking transfer service activities to source programs, the method comprising:

buffering, in a detection buffer within a memory, a plurality of send Advanced Local Procedure Call (ALPC) messages and a plurality of receive ALPC messages created by an operating system when a Background Intelligent Transfer Service (BITS) of the operating system is used to download one or more files to the computing device from a network;

identifying a first send ALPC message within the plurality of send ALPC messages and a first receive ALPC message within the plurality of receive ALPC messages, wherein the first send ALPC message and the first receive ALPC message have a first common message ID;

pairing the first send ALPC message and the first receive ALPC message to create a first ALPC message pair, wherein the first ALPC message pair includes:
  a first timestamp field having a value corresponding to a time of creation of at least one of the first send ALPC message and the first receive ALPC message,
  a first ALPC source process ID corresponding to a send process ID of the first send ALPC message,
  a first ALPC source thread ID corresponding to a send thread ID of the first send ALPC message,
  a first ALPC destination process ID corresponding to a receive process ID of the first receive ALPC message, and
  a first ALPC destination thread ID corresponding to a receive thread ID of the first receive ALPC message;

receiving a notification that a temporary file has been created by the BITS, the temporary file created as part of a file download initiated by the source program;

determining that (1) the value in the first timestamp field corresponds to a time of creation of the temporary file, and (2) the first ALPC destination process ID corresponds to a process ID of the temporary file, and (3) the first ALPC destination thread ID corresponds to a thread ID of the temporary file;
evaluating the first ALPC source process ID to identify the source program responsible for initiating the creation of the temporary file;
determining, based at least in part on the temporary file, that the source program is a malware program; and
performing a security action on the source program.

8. The one or more non-transitory computer-readable media of claim 7, further comprising:
receiving a notification that the BITS has renamed the temporary file using a new file name; and
assigning the new file name to the source program.

9. The one or more non-transitory computer-readable media of claim 7, further comprising:
identifying a second send ALPC message within the plurality of send ALPC messages and a second receive ALPC message within the plurality of receive ALPC messages, wherein the second send ALPC message and the second receive ALPC message have a second common message ID;
pairing the second send ALPC message and the second receive ALPC message to create a second ALPC message pair, wherein the second ALPC message pair includes:
a second timestamp field having a value corresponding to a time of creation of at least one of the second send ALPC message and the second receive ALPC message,
a second ALPC source process ID corresponding to a send process ID of the second send ALPC message,
a second ALPC source thread ID corresponding to a send thread ID of the second send ALPC message,
a second ALPC destination process ID corresponding to a receive process ID of the second receive ALPC message, and
a second ALPC destination thread ID corresponding to a receive thread ID of the second receive ALPC message;
receiving a notification that a temporary file has been created by the BITS, the temporary file created as part of a file download initiated by the source program;
determining that (1) the value in the second timestamp field does not correspond to a time of creation of the temporary file, or (2) the second ALPC destination process ID does not correspond to a process ID of the temporary file, or (3) the second ALPC destination thread ID does not correspond to a thread ID of the temporary file; and
discarding the second ALPC message pair.

10. The one or more non-transitory computer-readable media of claim 7, wherein the source program is determined to be a malware program by evaluating the temporary file and determining that the temporary file is a malware file.

11. The one or more non-transitory computer-readable media of claim 7, wherein the security action is quarantining the source program.

12. The one or more non-transitory computer-readable media of claim 7, wherein the security action is deleting the source program.

13. A computer-implemented method for detecting malware by linking scheduled task activities to source programs, at least a portion of the method performed by a computing device comprising one or more processors, a memory, and an operating system stored within the memory, the computer-implemented method comprising:
buffering, in a detection buffer within the memory, a plurality of send Advanced Local Procedure Call (ALPC) messages and a plurality of receive ALPC messages created by the operating system when a Scheduled Task Service (STS) of the operating system is used to schedule a task to be performed by the operating system;
identifying a first send ALPC message within the plurality of send ALPC messages and a first receive ALPC message within the plurality of receive ALPC messages, wherein the first send ALPC message and the first receive ALPC message have a first common message ID;
pairing the first send ALPC message and the first receive ALPC message to create a first ALPC message pair, wherein the first ALPC message pair includes:
a first timestamp field having a value corresponding to a time of creation of at least one of the first send ALPC message and the first receive ALPC message,
a first ALPC source process ID corresponding to a send process ID of the first send ALPC message,
a first ALPC source thread ID corresponding to a send thread ID of the first send ALPC message,
a first ALPC destination process ID corresponding to a receive process ID of the first receive ALPC message, and
a first ALPC destination thread ID corresponding to a receive thread ID of the first receive ALPC message;
receiving a notification that the STS has performed a defined operation, the STS performing the defined operation while in use by the source process;
determining that (1) the value in the first timestamp field corresponds to a time period when the defined operation was performed, and (2) the first ALPC destination process ID corresponds to a process ID of the STS involved in performing the defined operation, and (3) the first ALPC destination thread ID corresponds to a thread ID of the STS involved in performing the defined operation;
evaluating the first ALPC source process ID to identify the source program responsible for performing the defined operation;
determining, based at least in part on the defined operation, that the source program is a malware program; and
performing a security action on the source program.

14. The method of claim 13, wherein the defined operation corresponds to creation of a file in a defined path.

15. The method of claim 14, further comprising parsing the file in order to determine one or more tasks created by the source program.

16. The method of claim 15, further comprising parsing the file to determine one or more commands, which executes the one or more tasks created by the source program.

17. The method of claim 13, wherein the defined operation corresponds to creation of new entry in a defined registry path.

18. The method of claim 13, further comprising:
identifying a second send ALPC message within the plurality of send ALPC messages and a second receive ALPC message within the plurality of receive ALPC messages, wherein the second send ALPC message and the second receive ALPC message have a second common message ID;
pairing the second send ALPC message and the second receive ALPC message to create a second ALPC message pair, wherein the second ALPC message pair includes:

a second timestamp field having a value corresponding to a time of creation of at least one of the second send ALPC message and the second receive ALPC message, a second ALPC source process ID corresponding to a send process ID of the second send ALPC message, a second ALPC source thread ID corresponding to a send thread ID of the second send ALPC message, a second ALPC destination process ID corresponding to a receive process ID of the second receive ALPC message, and a second ALPC destination thread ID corresponding to a receive thread ID of the second receive ALPC message;

receiving a notification that the STS has performed a defined operation, the STS performing the defined operation while in use by the source process;

determining that (1) the value in the second timestamp field does not correspond to a time period when the defined operation was performed, or (2) the second ALPC destination process ID does not correspond to a process ID of the STS involved in performing the defined operation, or (3) the second ALPC destination thread ID does not correspond to a thread ID of the STS involved in performing the defined operation; and discarding the second ALPC message pair.

19. The method of claim 13, wherein the source program is determined to be a malware program by evaluating the defined operation and determining that the defined operation is a malware operation.

20. The method of claim 13, wherein the security action is quarantining or deleting the source program.

* * * * *